(12) United States Patent
Tabuchi

(10) Patent No.: US 10,748,574 B2
(45) Date of Patent: Aug. 18, 2020

(54) APPARATUS AND METHOD FOR RETRACTING THE MAGNETIC HEAD TO A HOME POSITION AFTER A PREDETERMINED TIME PERIOD

(71) Applicant: CANON KABUSHIKI KAISHA, Tokyo (JP)

(72) Inventor: Hidetaka Tabuchi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/404,489

(22) Filed: May 6, 2019

(65) Prior Publication Data

US 2019/0355390 A1 Nov. 21, 2019

(30) Foreign Application Priority Data

May 18, 2018 (JP) .................................. 2018-096018

(51) Int. Cl.
G11B 19/00 (2006.01)
G11B 19/14 (2006.01)
G11B 19/06 (2006.01)
G06F 3/12 (2006.01)
G11B 21/10 (2006.01)

(52) U.S. Cl.
CPC ............ *G11B 19/14* (2013.01); *G06F 3/1221* (2013.01); *G06F 3/1229* (2013.01); *G11B 19/06* (2013.01); *G11B 21/10* (2013.01)

(58) Field of Classification Search
None
See application file for complete search history.

(56) References Cited

U.S. PATENT DOCUMENTS

| | | | | |
|---|---|---|---|---|
| 4,717,968 A * | 1/1988 | Painton | ................. | G11B 19/04 360/69 |
| 5,469,553 A * | 11/1995 | Patrick | ................. | G05B 19/042 360/69 |
| 5,682,273 A * | 10/1997 | Hetzler | ................. | G06F 1/3221 360/75 |
| 6,441,987 B1 * | 8/2002 | Lee | ................. | G11B 5/54 360/78.04 |
| 8,125,729 B2 * | 2/2012 | Ohzeki | ................. | G11B 5/5526 360/78.04 |
| 2005/0268132 A1 * | 12/2005 | Yun | ................. | G06F 1/3203 713/323 |
| 2006/0262448 A1 * | 11/2006 | Okada | ................. | G11B 5/54 360/69 |
| 2007/0002485 A1 * | 1/2007 | Jun | ................. | G11B 19/04 360/75 |
| 2010/0318825 A1 * | 12/2010 | Fulkerson | ................. | G06F 1/3203 713/323 |
| 2019/0132468 A1 * | 5/2019 | Fukui | ................. | H04N 1/2104 |
| 2019/0310575 A1 * | 10/2019 | Hada | ................. | G03G 15/5004 |

FOREIGN PATENT DOCUMENTS

JP 2007-012250 A 1/2007

* cited by examiner

*Primary Examiner* — Tan X Dinh
(74) *Attorney, Agent, or Firm* — Canon U.S.A., Inc., IP Division

(57) ABSTRACT

An information processing apparatus includes a hard disk drive including a disk configured to store data therein and a head configured to access the disk and a control unit. The control unit causes the head to be retracted to a home position after a predetermined time period, based on an operation mode, has passed after performing control to cause the head to access the disk.

16 Claims, 6 Drawing Sheets

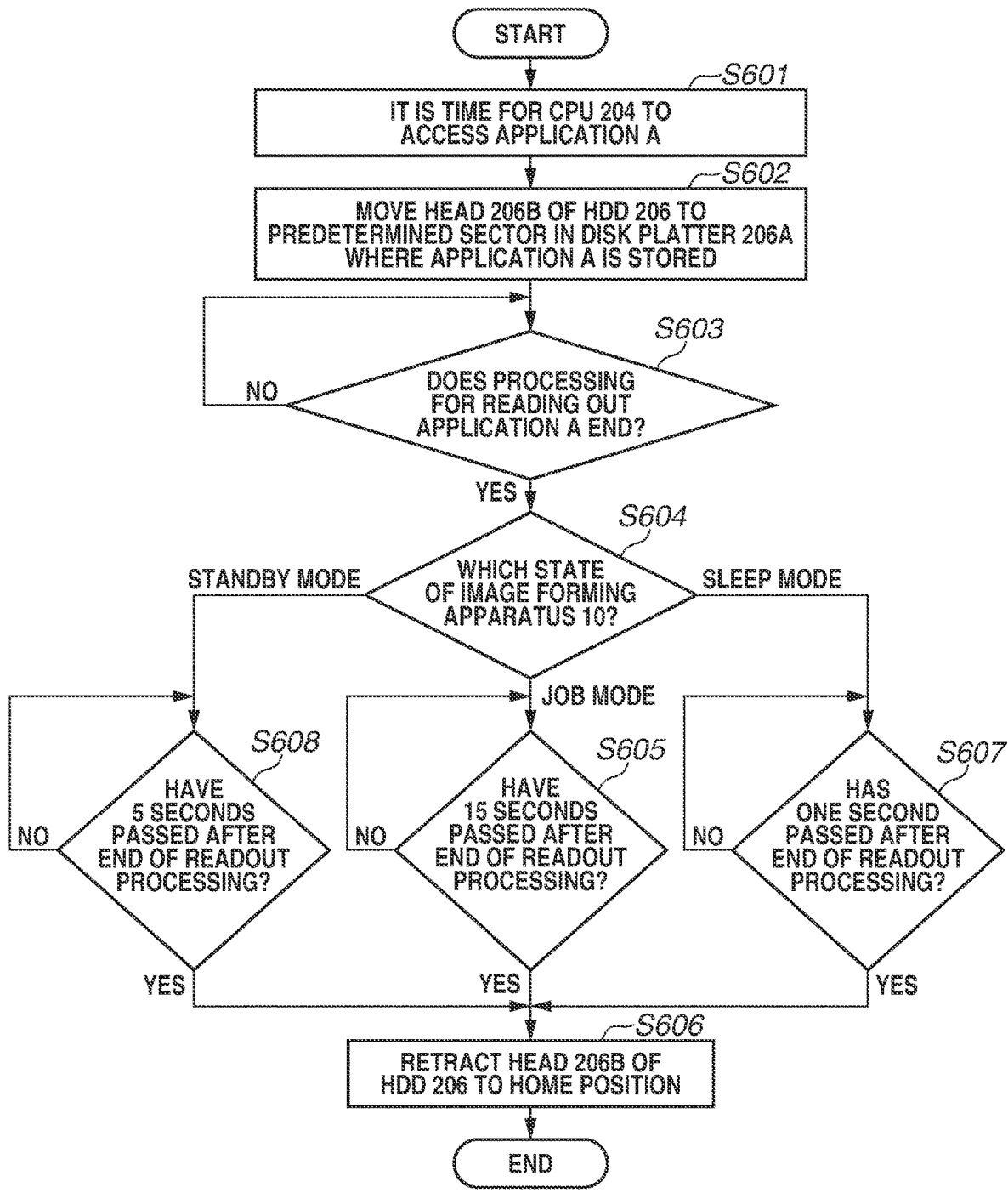

APPARATUS AND METHOD FOR RETRACTING THE MAGNETIC HEAD TO A HOME POSITION AFTER A PREDETERMINED TIME PERIOD

BACKGROUND

Field

The present disclosure relates to an information processing apparatus and a method for controlling the information processing apparatus.

Description of the Related Art

Hard disk drives (HDDs) are magnetic storage units, and are mounted on various information processing apparatuses (image forming apparatuses and the like besides personal computers (PCs) and servers). For example, such an image forming apparatus stores a log of the image forming apparatus into an HDD in addition to image data during print job processing. An application installed in the image forming apparatus also regularly accesses the HDD. The HDD includes a disk, which is mainly a magnetic recording medium, and a head, which reads and writes data, and the head accesses the disk while moving through a gap with the disk rotating at a high speed (this is called a load). This mechanism allows the data to be read and written quickly and randomly.

However, when being subjected to an impact during the load, the HDD may incur damage on the head or the disk. Therefore, for the HDD, it has become mainstream to retract the head to a home position after the load. Japanese Patent Application Laid-Open No. 2007-012250 discusses a method that performs control of returning the head to the home position after a predetermined time period after the data is read/written, instead of returning the head immediately after that from the viewpoint of improving a performance of the information processing apparatus using the HDD.

However, the access to the HDD may frequently occur depending on the information processing apparatus. In this case, the above-described method may lead to an increase in a total time period until the head is returned to the home position after the data is read/written, thereby resulting in an undesirable reduction in a duration of life of the HDD.

SUMMARY

According to an aspect of the present disclosure, an information processing apparatus includes a hard disk drive including a disk configured to store data therein and a head configured to access the disk and a control unit. The control unit causes the head to be retracted to a home position after a predetermined time period, based on an operation mode, has passed after performing control to cause the head to access the disk.

Further features will become apparent from the following description of exemplary embodiments with reference to the attached drawings.

BRIEF DESCRIPTION OF THE DRAWINGS

FIG. 6 is a flowchart illustrating a method for controlling the load time period of the HDD.

DESCRIPTION OF THE EMBODIMENTS

In the following description, an information processing apparatus according to an exemplary embodiment will be described using an image forming apparatus as an example thereof. Components that will be described in this exemplary embodiment are merely cited as one example, and are not intended to be limiting.

Figure 1:
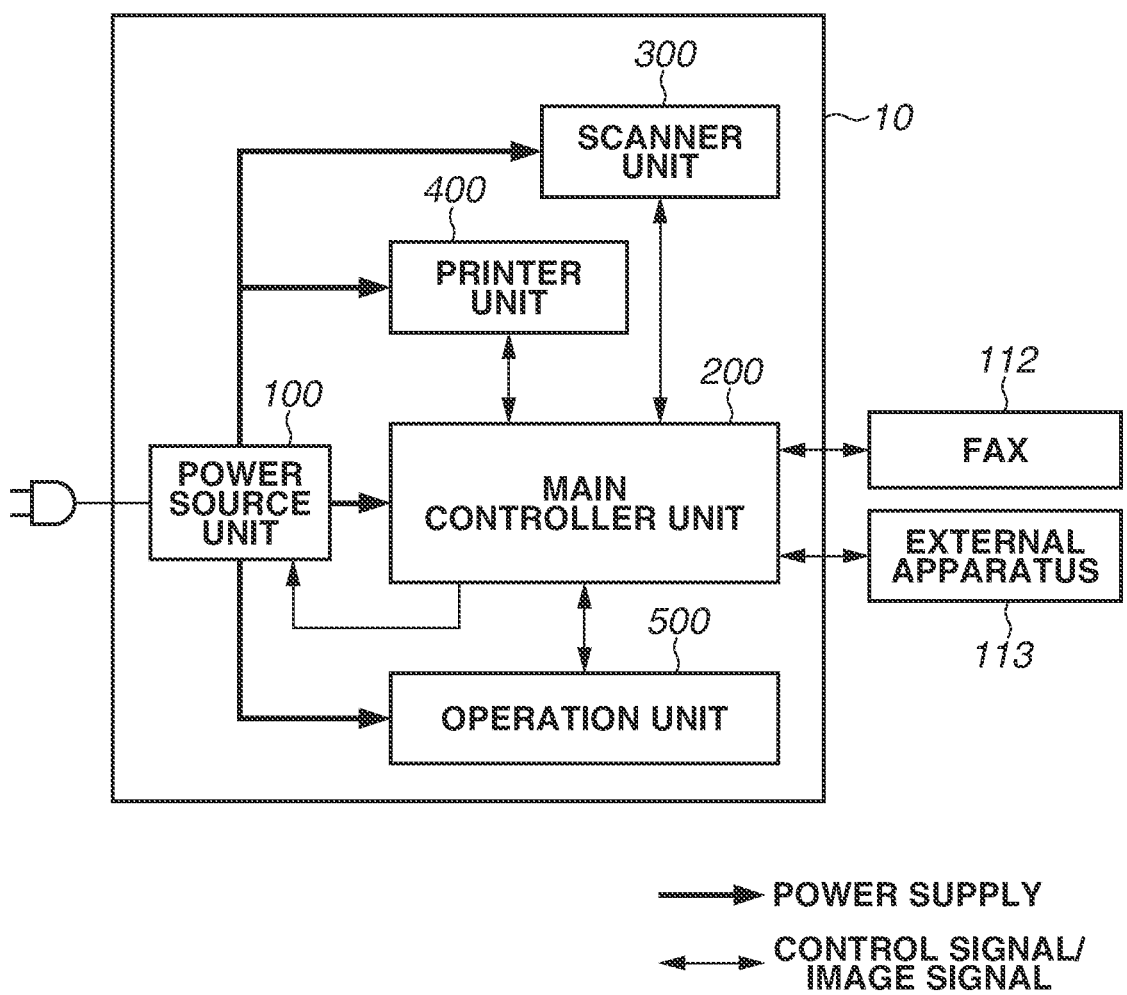
FIG. 1 is a block diagram illustrating an example of a configuration of an image forming apparatus.

FIG. 1 is a block diagram illustrating an example of a configuration of an image forming apparatus 10 according to an exemplary embodiment. The image forming apparatus 10 is a multi-function peripheral (MFP) having a plurality of functions, such as a print function, a scanner function, a copy function, and a facsimile (FAX) function. The image forming apparatus 10 includes a power source unit 100, a main controller unit 200, a scanner unit 300, a printer unit 400, and an operation unit 500. The power source unit 100 supplies power to each of the units of the image forming apparatus 10. The scanner unit 300 optically reads an image from an original document and generates image data. The printer unit 400 forms (prints) an image on a recording medium (a sheet) based on the electrophotographic method under control by the main controller unit 200. The main controller unit 200 processes image data input from the scanner unit 300, an external apparatus 113, or a FAX 112, and outputs it to the printer unit 400. The main controller unit 200 controls an overall operation of the image forming apparatus 10 including the scanner unit 300 and the printer unit 400 based on a user instruction input to the operation unit 500.

The image forming apparatus 10 has three types of operation modes: a job mode, a standby mode, and a sleep mode. In the job mode, the image forming apparatus 10 carries out a job such as a copy operation and a scan operation, and power is supplied to all elements of the image forming apparatus 10. In the standby mode and the sleep mode (a non-job mode), the image forming apparatus 10 does not carry out any jobs, and power is supplied to less than all elements of the image forming apparatus 10. In the standby mode, the image forming apparatus 10 is in a state of waiting for a job, and power is supplied to elements other than the scanner unit 300 and the printer unit 400. In the sleep mode, only a required minimum number of elements of the image forming apparatus 10 (a unit that communicates externally such as the FAX 112 and the main controller unit 200) is in operation, and power is supplied to these required minimum elements. When a job is input from the operation unit 500 or the external apparatus 113 such as a personal computer (PC), the image forming apparatus 10 transitions into the job mode and performs an image forming operation or the like. When the job ends, the image forming apparatus 10 transitions into the standby mode from the job mode. In a case where the image forming apparatus 10 is unused even after a predetermined time period has passed or due to execution of an operation for causing a transition into the sleep mode on the operation unit 500 after the transition into the standby mode, the image forming apparatus 10 transitions into the sleep mode from the standby mode.

Figure 2:
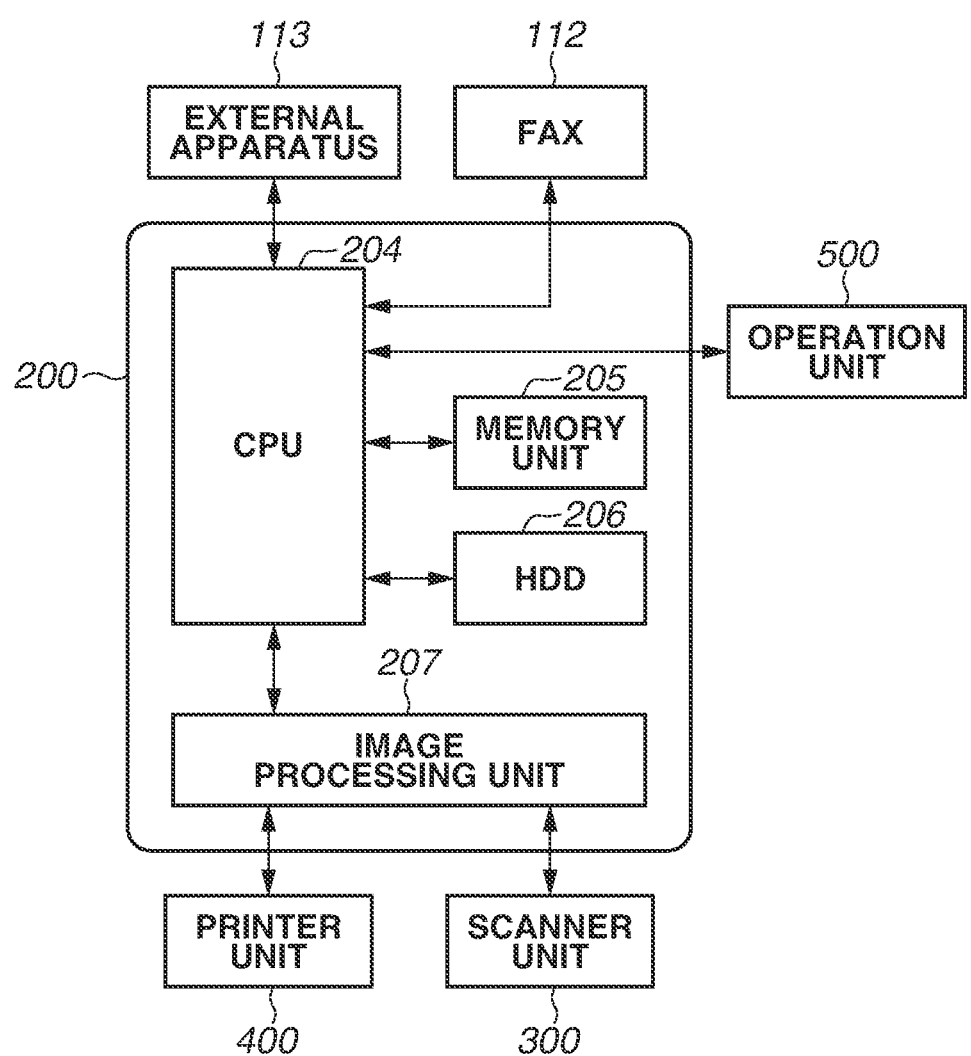
FIG. 2 is a block diagram illustrating an example of a configuration of a main controller.

FIG. 2 is a block diagram illustrating an example of a configuration of the main controller unit 200 illustrated in FIG. 1. The main controller unit 200 includes a central processing unit (CPU) 204, a memory unit 205, a hard disk drive (HDD) 206, and an image processing unit 207. The CPU 204 is a central processing unit that controls the entire image forming apparatus 10. The CPU 204 inputs signals from the operation unit 500, the FAX 112, and the external apparatus 113, and realizes functions such as the copy function, the print function, and the FAX function. The CPU 204 is a control unit that is connected to an HDD controller 206C (FIG. 3) in the HDD 206 and controls the HDD 206. Detailed control will be described below.

The memory unit 205 is a volatile memory such as a Double Data Rate Synchronous Dynamic Random Access Memory (DDR SDRAM), and is a storage device temporarily storing therein, for example, a job carried out by the CPU 204. The HDD 206 is a storage device connected to the CPU 204 and provided for storing, for example, an application and various kinds of setting information regarding the image forming apparatus 10. The image processing unit 207 is connected to the CPU 204, the printer unit 400, and the scanner unit 300. The image processing unit 207 performs image processing such as color space conversion on a digital image output from the scanner unit 300, and outputs data after the image processing to the CPU 204. The image processing unit 207 performs the image processing such as the color space conversion on the image data read by the scanner unit 300, converts it into bitmap data, and outputs the bitmap data to the printer unit 400.

Figure 3:
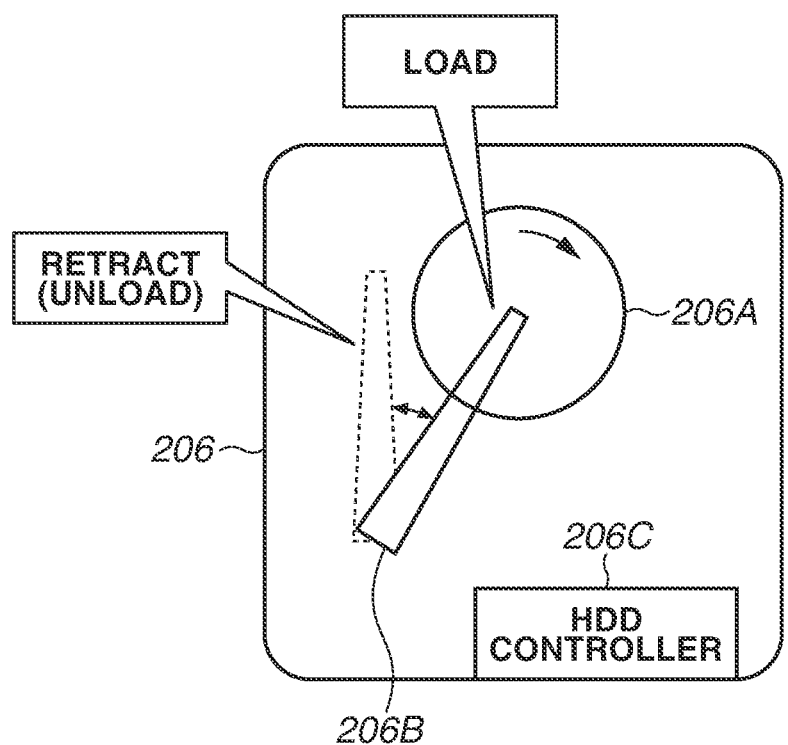
FIG. 3 illustrates an example of a configuration of a hard disk drive (HDD).

FIG. 3 illustrates an example of a configuration of the HDD 206 illustrated in FIG. 2. The HDD 206 includes a plurality of disk platters 206A stacked at predetermined intervals, a magnetic head (hereinafter referred to as a head) 206B, and the HDD controller 206C. The disk platters 206A record data therein. The head 206B accesses the disk platters 206A. The HDD controller 206C inputs a control command directed to the HDD 206 from the CPU 204, and converts it into a Serial Advanced Technology Attachment (SATA) command to control the HDD 206. When inputting writing, reading, and deletion commands from the CPU 204, the HDD controller 206C converts them into SATA commands respectively corresponding to them, and causes the head 206B to access a specific sector in the disk platters 206A. Then, the HDD controller 206C performs writing, reading, and deletion processing with respect to the application and the data stored in the HDD 206. When inputting a command to retract the head 206B from the CPU 204, the HDD controller 206C also converts it into a SATA command in a similar manner, thereby retracting the head 206B to a home position.

The head 206B inputs the SATA commands from the HDD controller 206C, and performs processing for retracting to the home position, accessing the specific sector in the disk platters 206A, and reading, writing, and deleting information. A state in which the head 206B is retracted to the home position will be referred to as an unload state, and a state in which the head 206B is located above the disk platters 206A will be referred to as a load state. A time period during which the head 206B is in the load state will be referred to as a load time period.

Figure 4:
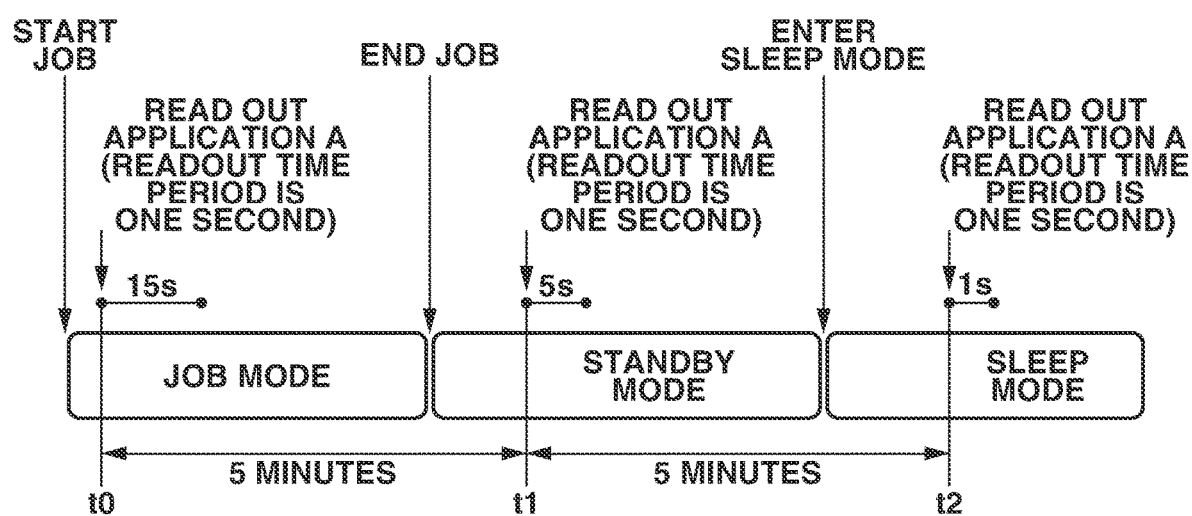
FIG. 4 illustrates a load time period when an application accesses the HDD.

FIG. 4 illustrates an example in which the CPU 204 reads out and executes an application program A (hereinafter referred to as an application A) stored in the HDD 206. In the following description, the present exemplary embodiment will be described referring to an example in which a different time period is taken until the CPU 204 causes the head 206B to be retracted to the home position after the processing for reading out the application A ends depending on the operation mode of the image forming apparatus 10. For example, suppose that, in the job mode of the image forming apparatus 10, 15 seconds is set as a time period since a time at which the processing for reading out the application A ends (one second after time t0) until the head 206B is retracted to the home position for the purpose of improving the performance. Suppose that, in the standby mode, 5 seconds is set as the time period since the time at which the processing for reading out the application A ends (one second after time t1) until the head 206B is retracted to the home position. Suppose that, in the sleep mode, one second is set as the time period since the time at which the processing for reading out the application A ends (one second after time t2) until the head 206B is retracted to the home position. Suppose that the CPU 204 regularly reads out the application A every five minutes, i.e., at time t0, time t1, and time t2, and spends one second for the processing for reading out the application A.

The image forming apparatus 10 starts a job and transitions into the job mode. At time t0 during the job mode, the CPU 204 reads out the application A. In the job mode, it takes one second for the readout, and it takes 15 seconds since the readout ends until the head 206B is retracted to the home position, which means that the load time period lasts for 16 seconds.

At time t1 after five minutes have passed since time t0, the CPU 204 reads out the application A. In this case, the job ends and the image forming apparatus 10 transitions into the standby mode at a time between time t0 and time t1. In the standby mode, it takes one second for the readout, and it takes 5 seconds since the readout ends until the head 206B of the HDD 206 is retracted to the home position, which means that the load time period lasts for 6 seconds. The load time period in the standby mode (6 seconds) is a time period that can be reduced by 10 seconds compared to the load time period in the job mode (16 seconds).

At time t2 after five minutes have passed since time t1, the CPU 204 reads out the application A again. The image forming apparatus 10 transitions into the sleep mode from the standby mode at a time between time t1 and time t2. In the sleep mode, it takes one second for the readout, and it takes one second since the readout ends until the head 206B of the HDD 206 is retracted to the home position, which means that the load time period lasts for 2 seconds. The load time period in the sleep mode (2 seconds) is shorter than the load time period in the standby mode (6 seconds). The load time period in the sleep mode (2 seconds) is a time period that can be reduced by 14 seconds compared to the load time period in the job mode (16 seconds).

The access to the HDD 206 can frequently occur in the image forming apparatus 10. For example, in the image forming apparatus 10, the application A stored in the memory unit 205 in the image forming apparatus 10 regularly accesses the HDD 206 to read/write information, in addition to writing of a log of the image forming apparatus 10. In the job mode, the time period required to access the data in the HDD 206 is one second when the application A accesses the HDD 206. In the job mode, 15 seconds is set as the time period until the head 206B of the HDD 206 is returned to the home position after the access to the HDD 206 for the purpose of improving the performance of the image forming apparatus 10. At this time, 16 seconds in total is taken as the time period (the load time period) since the application A starts the access until the head 206B of the HDD 206 is returned to the home position.

Performance of the image forming apparatus 10 need only be improved when in the job mode. In the standby mode and the sleep mode, the performance of the image forming apparatus 10 is not affected, even if the head 206B of the HDD 206 is returned to the home position immediately after the access to the HDD 206 ends. The image forming apparatus 10 is kept in the standby mode and the sleep mode for a longer time period than in the job mode. Therefore, if a fixed time period is set as the time period to return the head 206B to the home position after the data is written into or read out from the HDD 206 regardless of the operation mode of the image forming apparatus 10, the load time periods in the standby mode and the sleep mode undesirably increase. This causes the load time period of the HDD 206 to exceed its life rating earlier than expected, leading to an undesirable reduction in the duration of life of the image forming apparatus 10.

In the present exemplary embodiment, 16 seconds is spent as the load time period in the job mode, 6 seconds as the load time period in the standby mode, and 2 seconds as the load time period in the sleep mode. The load time periods in the standby mode and the sleep mode are shorter than the load time period in the job mode, resulting in performance improvement on the part of the image forming apparatus 10. The image forming apparatus 10 can prolong the life duration of the HDD 206 and maintain the improvement of the performance by reducing the load time periods in the standby mode and the sleep mode.

Figure 5:
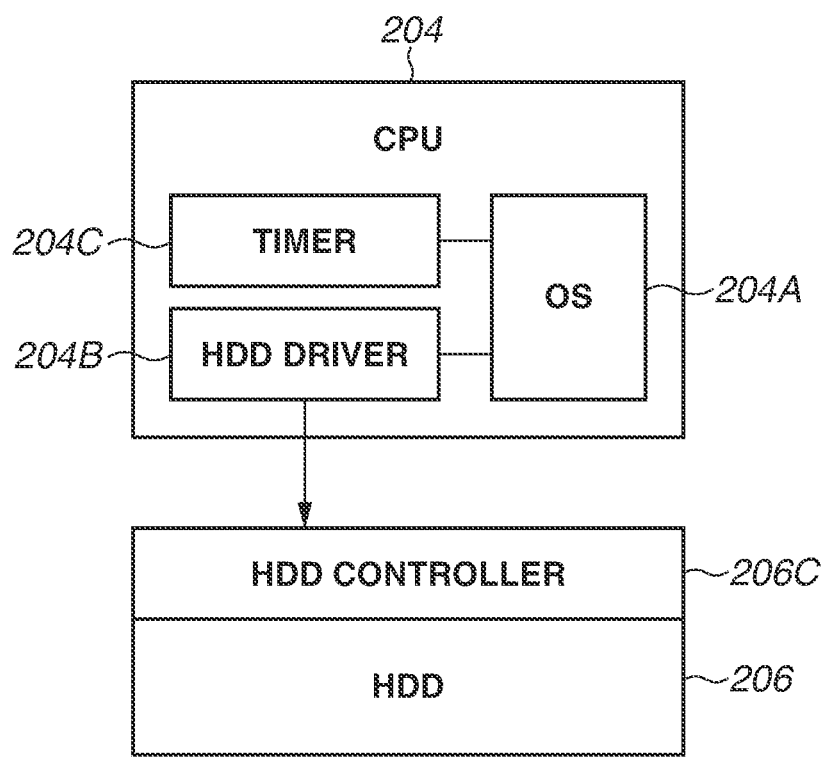
FIG. 5 is a block diagram illustrating control of the HDD.

FIG. 5 is a block diagram illustrating examples of configurations of the CPU 204 and the HDD 206. The CPU 204 includes an operating system (OS) unit 204A, which recognizes a state of the image forming apparatus 10, an HDD driver 204B, which outputs a command to the HDD 206, and a timer 204C, which measures time. The OS unit 204A and the HDD driver 204B are software (programs). The timer 204C measures time. The HDD driver 204B outputs a command for controlling the head 206B to the HDD controller 206C based on the time measured by the timer 204C and the state of the image forming apparatus 10 recognized by the OS unit 204A.

FIG. 6 is a flowchart illustrating a method for controlling the image forming apparatus 10. A behavior of the head 206B of the HDD 206 when the CPU 204 reads out the application A will be described below. The CPU 204 operates under the same conditions as the conditions described with reference to FIG. 4, regarding various kinds of operation conditions such as the processing for reading out the application A and the time period until the CPU 204 causes the head 206B to be retracted to the home position after reading out the application A.

In step S601, the CPU 204 waits until it is time to read out the application A (it is time to access the application A). Then, when it is time to read out the application A, the processing proceeds to step S602. In step S602, the CPU 204 outputs a command to read out the application A to the HDD controller 206C. The HDD controller 206C inputs the command output from the CPU 204, moves the head 206B to above a predetermined sector in the disk platters 206A where the application A is stored, and starts the readout of (the access to) the application A. The access is not limited to the readout, and can be writing or deletion. In the following description, the present processing will be described assuming that the readout is executed as an example of the access. In step S603, the CPU 204 waits until the processing for reading out the application A ends. When the processing for reading out the application A ends (YES in step S603), the processing proceeds to step S604.

In step S604, the CPU 204 determines a state of an operation mode of the image forming apparatus 10. In a case where the image forming apparatus 10 is in the job mode (JOB MODE in step S604), the processing proceeds to step S605. In a case where the image forming apparatus 10 is in the standby mode (STANDBY MODE in step S604), the processing proceeds to step S608. In a case where the image forming apparatus 10 is in the sleep mode (SLEEP MODE in step S604), the processing proceeds to step S607.

In step S605, the CPU 204 determines whether 15 seconds have passed since the end of the processing for reading out the application A. The CPU 204 waits until 15 seconds have passed. When 15 seconds have passed (YES in step S605), the processing proceeds to step S606.

In step S608, the CPU 204 determines whether 5 seconds have passed since the end of the processing for reading out the application A. The CPU 204 waits until 5 seconds have passed. When 5 seconds have passed (YES in step S608), the processing proceeds to step S606.

In step S607, the CPU 204 determines whether one second has passed since the end of the processing for reading out the application A. The CPU 204 waits until one second has passed. When one second has passed (YES in step S607), the processing proceeds to step S606.

In step S606, the CPU 204 outputs a retraction command to the HDD controller 206C. In response thereto, the HDD controller 206C retracts the head 206B to the home position.

In the above-described process, the image forming apparatus 10 changes the time period until the head 206B of the HDD 206 is retracted to the home position based on the operation mode of the image forming apparatus 10 after the HDD 206 inputs an access command, such as the readout from the CPU 204 and the access processing ends. The CPU 204 performs control to cause the head 206B to be retracted to the home position after the predetermined time period, based on the operation mode, has passed after performing control to cause the head 206B to access the disk platters 206A. This control enables the image forming apparatus 10 to spend a required minimum time period as the load time period of the HDD 206, thereby allowing the image forming apparatus 10 to achieve both the increase in the life duration of the HDD 206 and the improvement of the performance of the image forming apparatus 10.

In the present exemplary embodiment, the image forming apparatus 10 has been described based on the control of changing the time period until the head 206B of the HDD 206 is retracted to the home position based on the operation mode of the image forming apparatus 10, but is not limited thereto. The image forming apparatus 10 can perform control of changing the time period to retract the head 206B to the home position after the processing for reading out the application ends based not only on the operation mode, but also the application that accesses the HDD 206. The CPU 204 performs control to cause the head 206B to be retracted to the home position after a first predetermined time period has passed after performing control to cause the head 206B to read out a first application from the disk platters 206A. The CPU 204 performs control to cause the head 206B to be retracted to the home position after a second predetermined time period has passed after performing control to cause the head 206B to read out a second application from the disk platters 206A. The above-described first predetermined time period and second predetermined time period are different from each other.

The image forming apparatus 10 can be subjected to a change made by a user as to a setting of the image forming apparatus 10 with use of the operation unit 500 when being in the standby mode. In this case, the image forming apparatus 10 can perform control of changing the time period to return the head 206B of the HDD 206 to the home position according to whether the operation unit 500 is being operated or whether the access is executed within a time period according to a threshold value since the last operation. The CPU 204 performs control to cause the head 206B to be retracted to the home position after the predetermined time period, based on the operation on the operation unit 500, has passed after performing control to cause the head 206B to access the disk platters 206A. The above-described predetermined time period is different based on whether the operation unit 500 is being operated or whether the access is executed within the time period based on the threshold value since the last operation.

In the present exemplary embodiment, the information processing apparatus has been described using the image forming apparatus 10 as an example thereof, but is not limited thereto. The present exemplary embodiment is not limited to the image forming apparatus 10, which is equipped with the HDD 206, has the plurality of operation modes, and changes the time period since the reading/writing processing directed to the HDD 206 ends until the head 206B of the HDD 206 is retracted to the home position. The present exemplary embodiment can be applied to all information processing apparatuses without being limited to the image forming apparatus 10.

The above-described exemplary embodiment(s) merely discuss one or more examples and is should not be seen as limiting.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-096018, filed May 18, 2018, which is hereby incorporated by reference herein in its entirety.

What is claimed is:

1. An information processing apparatus comprising:
a hard disk drive including a disk configured to store data therein and a head configured to access the disk; and
a control unit configured to cause the head to move to a home position from the disk in accordance with a lapse of a predetermined time period in a state of no access to the hard disk drive after the head moved onto the disk,
wherein the predetermined time period in a second mode, in which the information processing apparatus is unable to execute a job, is shorter than the predetermined time period in a first mode, in which the information processing apparatus is able to execute a job.

2. The information processing apparatus according to claim 1,
wherein, in the first mode, power is supplied to all elements of the information processing apparatus, and
wherein, in the second mode, power is supplied to less than all elements of the information processing apparatus.

3. The information processing apparatus according to claim 1, wherein the job executed by the information processing apparatus is a print job.

4. The information processing apparatus according to claim 1,
wherein the first mode is a job mode in which the information processing apparatus executes a job or is a standby mode in which the information processing apparatus waits to execute a job, and
wherein the second mode is a sleep mode in which only a communication unit for external communication and a main controller operate.

5. The information processing apparatus according to claim 4, wherein the predetermined time period in the standby mode is shorter than the predetermined time period in the job mode.

6. The information processing apparatus according to claim 4, wherein the job executed by the information processing apparatus is a print job.

7. The information processing apparatus according to claim 1,
wherein the control unit performs control to cause the head to move to the home position in accordance with a lapse of a first predetermined time period after performing control to cause the head to read out a first application from the disk,
wherein the control unit performs control to cause the head to move to the home position after a second predetermined time period has passed after performing control to cause the head to read out a second application from the disk, and
wherein the first predetermined time period and the second predetermined time period are different from each other.

8. The information processing apparatus according to claim 1, wherein the predetermined time period is different based on whether the operation unit is being operated or whether access is executed within a time period based on a threshold value since a last operation.

9. The information processing apparatus according to claim 1, wherein the control unit performs control to regularly cause the head to read out the application from the disk.

10. A method for controlling an information processing apparatus including a hard disk drive including a disk configured to store data therein and a head configured to access the disk, and a control unit, the method comprising:
causing the head to move to a home position from the disk in accordance with a lapse of a predetermined time period in a state of no access to the hard disk drive after the head moved onto the disk,
wherein the predetermined time period in a second mode, in which the information processing apparatus is unable to execute a job, is shorter than the predetermined time period in a first mode, in which the information processing apparatus is able to execute a job.

11. The method according to claim 10,
wherein, in the first mode, power is supplied to all elements of the information processing apparatus, and
wherein, in the second mode, power is supplied to less than all elements of the information processing apparatus.

12. The method according to claim 10, wherein the job executed by the information processing apparatus is a print job.

13. The method according to claim 10,
wherein the first mode is a job mode in which the information processing apparatus executes a job or is a standby mode in which the information processing apparatus waits to execute a job, and
wherein the second mode is a sleep mode in which only a communication unit for external communication and a main controller operate.

14. The method according to claim 13, wherein the predetermined time period in the standby mode is shorter than the predetermined time period in the job mode.

15. The method according to claim 13, wherein the job executed by the information processing apparatus is a print job.

16. The method according to claim 10,
wherein, in accordance with a lapse of a first predetermined time period after the head reads out a first application from the disk, the head is moved to the home position,
wherein, after a second predetermined time period has passed after the head reads out a second application from the disk, the head is moved to the home position, and
wherein the first predetermined time period and the second predetermined time period are different from each other.

* * * * *